E. D. FINCH.
AUTOMOBILE SIGNAL.
APPLICATION FILED AUG. 4, 1914.
1,164,800.
Patented Dec. 21, 1915.
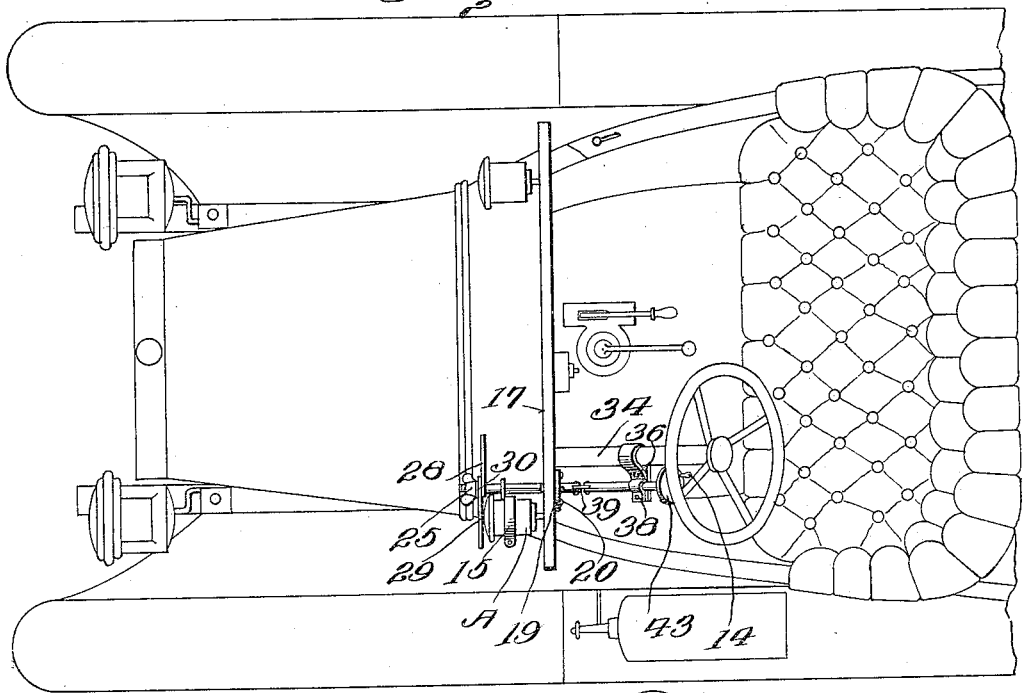
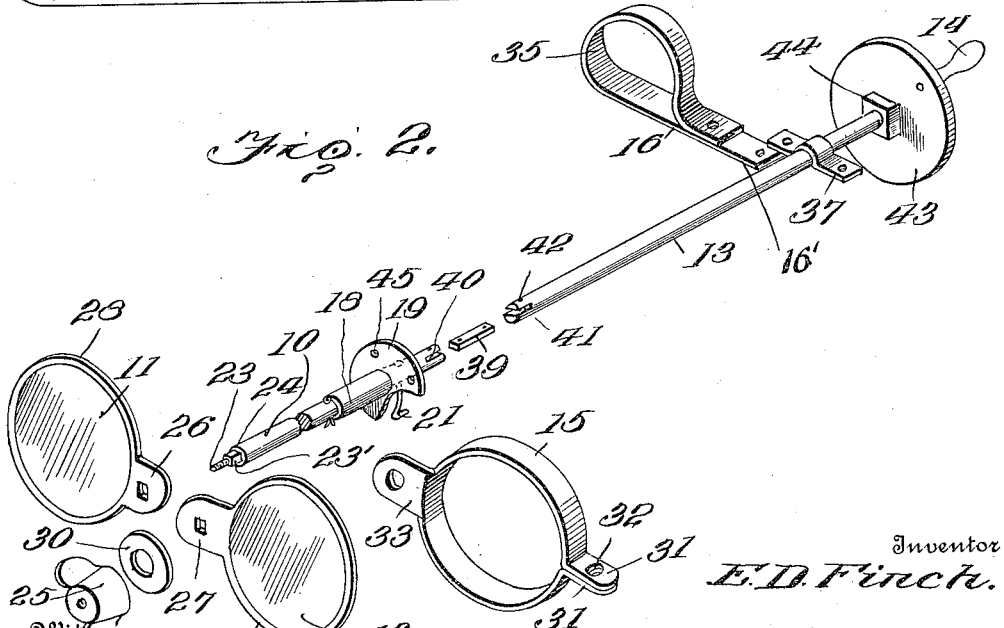

UNITED STATES PATENT OFFICE.

EMORY D. FINCH, OF ATLANTA, NEW YORK.

AUTOMOBILE-SIGNAL.

1,164,800.  Specification of Letters Patent.  Patented Dec. 21, 1915.

Application filed August 4, 1914. Serial No. 854,992.

*To all whom it may concern:*

Be it known that I, EMORY DWIGHT FINCH, citizen of the United States, residing at Atlanta, in the county of Steuben and State of New York, have invented certain new and useful Improvements in Automobile-Signals, of which the following is a specification.

My invention relates to new and useful improvements in automobile signals, and has particular reference to those of the visual type.

It ofttimes happens when automobiles are passing on narrow stretches of road that one or the other of the drivers desires to signal the second driver that the road is particularly narrow at that point or that for some other reason it is necessary to proceed slowly. Again, it ofttimes happens that one motorist encounters an impassable object in the road and desires that on the approach of another vehicle to warn the driver thereof that danger exists.

The above observations have impressed upon me the necessity of providing an automobile signaling device which may be employed by the driver of a machine to warn a vehicle coming in the opposite direction to proceed with caution or to come to a complete stop when danger exists.

Therefore, the principal object of my invention is to construct a signaling device which is operable from the steering post of an automobile and may be manipulated to dim the automobile head light by a blue glass plate denoting caution or by a red glass plate denoting danger and the advisability of coming to a complete stop.

In connection with the above stated objects I aim to provide a signaling apparatus which is relatively simple in construction and therefore, may be cheaply manufactured and is so designed that it may be easily and quickly applied to any standard form of automobile without requiring any material changes in any of the parts of either the signaling apparatus or automobile.

Another and more specific object of my invention is to provide a signaling apparatus consisting essentially of a pair of circular glass plates which are carried by and extend in opposite directions from a rotatable shaft which may be operated from the steering column of the machine to bring either of the glass plates into position to intercept the light rays from one of the automobile side lights.

The above recited and other incidental objects of a similar nature are accomplished by such means as are illustrated in the accompanying drawings, described in the following specification and then more particularly pointed out in the claims which are appended hereto and form a part of this application.

Referring to the drawings wherein is illustrated the preferred embodiment of my invention, as it is reduced to practice and throughout the several views of which similar reference numerals designate corresponding parts, Figure 1 is a top plan view of an automobile of standard lines equipped with my signaling apparatus. Fig. 2 is a detail perspective view showing a signaling apparatus removed from the automobile and with its several parts in disassembled relation, but indicating the manner in which the different elements are assembled.

As shown in detail in Fig. 2, my signaling apparatus consists essentially in a rotatable shaft 10, a pair of signal glasses 11 and 12, an operating rod 13, an operating handle 14 which controls the rod, a bracket 15 by which the shaft 10 is journaled at the side of the adjacent side lamp and a bracket 16 employed in properly securing the operating rod to the steering column of the automobile.

The shaft 10 is passed through the dash 17 of the automobile, being journaled in a bearing sleeve 18. This bearing sleeve is provided with an integral disk 19 which is designed to fit against the inner face of the dash and is secured thereto by screws or any other suitable fastening device 20. This member 19 constitutes not only a holding plate for the bearing sleeve 18 but also serves, in connection with the spring finger 21, to yieldably maintain the shaft 10 against rotation when the signal is set, as will be hereinafter more fully explained.

The shaft 10 is of such length that its inner end projects a considerable distance into the body of the vehicle, while its forward terminal extends slightly beyond the front of the lamp, indicated at A. In this connection, it will, of course, be apparent that the length of the shaft 10 may be varied to adapt it for use in connection with automobiles having side lamps which are located different distances from the dash. The forward terminal of the shaft 10 is reduced and threaded as indicated at 23. Immediately adjacent this threaded portion is formed a squared shoulder 23′ which is of a thickness greater than the diameter of the member 23. At the inner terminal of the member 23′ is formed an annular shoulder 24. Against this annular shoulder 24 are clamped, by means of a wing nut 25, the apertured ears 26 and 27 which extend laterally from a pair of circular frames 28 and 29. It will be noted that the apertures of the ears 26 and 27 are squared so that the frame members will be held against rotation on the squared shoulder 23′ when the ears are mounted thereon. It will also be observed that the member 23′ is of a length slightly less than the combined thickness of the two members 26 and 27. Thus the wing nut 25 may be firmly engaged against the ears so as to securely engage them against the annular shoulder 24. A washer, indicated at 30, may be interposed between the nut 25 and the ear members, if desired.

As will be noted upon reference to Fig. 2, the glass plates 11 and 12 which are of circular form, are received within and properly supported by the frames 28 and 29. In practice I find it preferable to form the member 11 from blue glass and the member 12 from red glass, although it is obvious that any other two colors may be employed without departing in any way from the spirit of my invention.

In order that the shaft 10 may be properly supported for rotation alongside of the lamp A, so as to permit the different colored glass plates 11 and 12 to be selectively moved in front of the lamp A, I provide the bracket 15. This member 15 is formed from a single strip of metal which is bent into an annulus whereby it may embrace the cylindrical body portion of the lamp A, which is of conventional design, as will be observed upon reference to Fig. 1.

The terminals of the member 15 are directed outwardly, producing ears 31 which are apertured as at 32 to receive a clamping bolt or screw. From the member 15 there extends an apertured ear 33 which lies in a plane at right angles to the plane of the members 31 and is adapted, as best shown in Fig. 1, to form a bearing for the outer terminal of the shaft 10.

The operating rod 13 is connected to the steering column 34 of the automobile by means of the bearing bracket 16. This member 16 is preferably formed from a single length of metal which is bent to produce a loop portion 35. The loop portion 35 embraces the steering column and is clamped thereabout by means of a screw or similar fastening device 36. One terminal of the member 16 is disposed in spaced relation to the other terminal, as shown in Fig. 2, so that the rod 13 may bear upon the second mentioned terminal 16′ thereof. A half bearing bracket or plate, indicated at 37, is engaged over the rod 13 and is secured to the terminal 16′ by the bolt 36 and a second bolt 38. It will thus be seen that the rod 13 is journaled in spaced relation to and supported by the steering column 34. A universal connection is employed between the shaft 10 and rod 13. This connection consists in a rigid member 39, the terminals of which are apertured and are received within the terminal bifurcations 40 and 41 of the members 10 and 13. By passing pivot pins through the apertures 42 of the bifurcated terminals of these members 10 and 13, it is obvious that the member 39 can be properly secured so as to form a universal connection.

The upper terminal of the rod 13 carries a disk 43 which is secured in place by means of bolts 44 which are threaded on the member 13 and bear against opposite sides of the disk. The handle 14 is of conventional design and is secured to the disk 43, in any desired manner.

From the foregoing description it will be obvious that by moving the handle to rotate the disk 43, the driver of the machine may move either the blue glass plate into such position that it intercepts the rays of light from the lamp A or that he may move the red glass into position in front of the lamp.

It is now to be observed that in practice, the blue glass is employed as a caution signal, while the red glass is employed as a danger signal. It is, of course, desirable that the members 11 and 12 be normally held in such position that they will not interfere with the customary use of the side lamp. It is also desirable that when moved into a signaling position, the members 11 and 12 be yieldably held therein until the necessity for the signals no longer exists. For this purpose I have provided, as previously stated, the disk 19 and the spring finger 21. As has also been previously explained, the disk 19 is fixed on the dash board. The spring tongue 21 is, however, fixed to the shaft 10 and is rotatable therewith, being disposed to bear against the face of the member 19. The member 19 is provided with four quadrantly spaced apertures 45 in which the free terminals of the spring finger 21 may engage. The four apertures are placed in such points that either one of the members 11 and 12 may be yieldably held in front of the lamp A or they may be held in non-signaling position.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

Having thus described the invention, what is claimed as new is:—

1. The combination with an automobile having a lamp, of a signaling apparatus including a shaft extending through the dash of the automobile alongside the lamp and rotatable on the dash, a pair of glass plates of different color fixed to the forward end of the shaft, an operating rod, a bearing bracket clamped on the steering column and supporting the operating rod in spaced relation thereto, a universal connection between the operating rod and the shaft, and a handle carried by the rod whereby the glass plates may be selectively disposed in front of the lamp to intercept the light rays thereof or may be disposed at one side of the lamp in non-signaling position.

2. The combination with an automobile having a lamp, of a signaling apparatus including a shaft extending through and rotatable in the dash of the vehicle alongside the lamp, a pair of glass plates fixed to the forward terminal of the shaft, and an operating rod operable from the driver's seat and universally connected to the shaft for rotating the same whereby either of the glass plates may be disposed in signaling position in front of the lamp or may be both disposed at one side in non-signaling position.

3. The combination with an automobile having a lamp, of a signaling apparatus including a shaft extending through and rotatable in the dash of the vehicle alongside the lamp, a pair of glass plates fixed to the forward terminal of the shaft, and an operating rod operable from the driver's seat and universally connected to the shaft for rotating the same, whereby either of the glass plates may be disposed in signaling position in front of the lamp or may be both disposed at one side in non-signaling position, and yieldable means carried by the shaft for normally holding the same in adjusted position.

4. The combination with an automobile having a lamp, of a signaling apparatus of the character described including a shaft extending through and rotatable in the dash of the automobile, a split ring collar adapted to be clamped about the lamp, an apertured ear extending from the collar and receiving the forward portion of the shaft, a pair of glass signal plates of different color fixed to the forward terminal of the shaft and removable therefrom, and an operating rod journaled at one side of the steering post of the automobile and universally connected to the shaft whereby the same may be rotated to dispose either of the glass plates in signaling position in front of the lamp, or may be both disposed in non-signaling position at one side of the lamp.

5. The combination with an automobile having a lamp, of a signaling apparatus including a bearing sleeve extending through the dash of the automobile alongside the lamp, a disk member carried on the inner terminal of the sleeve and secured to the inner face of the dash, a shaft extending through the sleeve and rotatable therein, a resilient finger carried by the shaft, said finger engaging with the disk for normally holding the shaft in adjusted position, a pair of glass plates rigidly secured to the lower terminal of the shaft, and an operating rod journaled on one side of the steering column of the automobile and operable to move either of the glass plates into signaling position in front of the automobile head lamp, said rod being also operable for moving the plates in non-signaling position at the sides of the lamp.

6. The combination with an automobile having a lamp, of a signaling apparatus including a shaft extending through and journaled in the dash of the automobile, a bracket mounted on the lamp and freely receiving the forward terminal portion of the shaft, a pair of circular metallic frames, means securing the frames in fixed position at the forward ends of the shaft, glass plates of different color in the frames, a clamp bracket mounted on the steering column of the automobile and constituting a bearing, and an operating rod journaled in the bearing and universally connected to the shaft whereby the same may be rotated to dispose either of the glass plates in front of the lamp in signaling position with respect thereto, or may be rotated to dispose both of the glass plates in non-signaling position at the sides of the lamp.

7. A device of the character described adapted for attachment to an automobile having a lamp and including a plate mounted upon the dash of the automobile and provided with spaced apertures, a shaft extending through said dash alongside the lamp, a translucent plate carried by the shaft, an operating rod connected to the shaft whereby the said plate may be disposed in front of the lamp or upon one side thereof, and a spring finger carried by the shaft and adapted to selectively engage in said apertures for holding the plate at adjustment.

8. A device of the character described adapted for attachment to an automobile having a lamp and including a shaft, a supporting bracket embracing the lamp and operatively connected to the shaft, a translucent plate carried by the shaft, an operating rod having universal connection with the shaft whereby the plate may be disposed in front of the lamp or upon one side thereof, and a bracket embracing the steering post of the automobile for operatively supporting the operating rod.

In testimony whereof I affix my signature in presence of two witnesses.

EMORY D. FINCH. [L. S.]

Witnesses:
CHESTER J. WISE,
EDMUND J. FINCH.

Copies of this patent may be obtained for five cents each, by addressing the "Commissioner of Patents, Washington, D. C."